US011476946B2

United States Patent
Nomura et al.

(10) Patent No.: US 11,476,946 B2
(45) Date of Patent: Oct. 18, 2022

(54) SIGNAL PROCESSING DEVICE AND TRANSMISSION DEVICE

(71) Applicant: FUJITSU LIMITED, Kawasaki (JP)

(72) Inventors: Yoshitaka Nomura, Shinagawa (JP); Hisao Nakashima, Kawasaki (JP); Nobukazu Koizumi, Kawasaki (JP); Daisuke Sasaki, Yokohama (JP); Yasuo Ohtomo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/553,870

(22) Filed: Dec. 17, 2021

(65) Prior Publication Data

US 2022/0303021 A1    Sep. 22, 2022

(30) Foreign Application Priority Data

Mar. 18, 2021  (JP) .............................. JP2021-044706

(51) Int. Cl.
*H04B 10/00* (2013.01)
*H04B 10/61* (2013.01)
*H04J 14/00* (2006.01)

(52) U.S. Cl.
CPC ....... *H04B 10/6164* (2013.01); *H04B 10/615* (2013.01); *H04B 10/6165* (2013.01)

(58) Field of Classification Search
CPC .... H04B 10/07; H04B 10/075; H04B 10/077; H04B 10/0779; H04B 10/2507; H04B 10/6164
See application file for complete search history.

(56) References Cited

U.S. PATENT DOCUMENTS

| | | | | |
|---|---|---|---|---|
| 2009/0129787 A1* | 5/2009 | Li | ........................ | H04B 10/63 398/208 |
| 2015/0125150 A1* | 5/2015 | Sugitani | ............ | H04B 10/6164 398/65 |
| 2017/0012803 A1* | 1/2017 | Sasaki | ................ | H04B 10/6161 |

FOREIGN PATENT DOCUMENTS

| | | |
|---|---|---|
| JP | 2012-248944 A | 12/2012 |
| JP | 2015-091068 A | 5/2015 |
| JP | 2020-039089 A | 3/2020 |

OTHER PUBLICATIONS

Meng Yan et al., "Experimental Investigation of Training Sequence for Adaptive Equalizer Initialization in DP-16QAM System", Tu.1.E.4, ECOC 2013 (Total 3 pages).

* cited by examiner

*Primary Examiner* — Daniel G Dobson
(74) *Attorney, Agent, or Firm* — Fujitsu Patent Center

(57) ABSTRACT

A signal processing device includes: a memory; and a processor coupled to the memory and configured to: compensate an electric field signal representing an electric field component in an optical signal input from a transmission channel for an optical frequency offset between light sources on a transmission side and a reception side of the optical signal based on a compensation value; calculate an estimated value of the optical frequency offset from data having a fixed pattern in the electric field signal; generate a plurality of candidates for the compensation value from the estimated value; calculate power of the optical signal compensated for the optical frequency offset based on each of the plurality of candidates; and select an initial value of the compensation value from the plurality of candidates based on the power of the optical signal.

8 Claims, 13 Drawing Sheets

PHASE DIFFERENCE ($\theta + 2\pi$)

PHASE DIFFERENCE ($\theta + 4\pi$)

SIGNAL PROCESSING DEVICE AND TRANSMISSION DEVICE

CROSS-REFERENCE TO RELATED APPLICATION

This application is based upon and claims the benefit of priority of the prior Japanese Patent Application No. 2021-44706, filed on Mar. 18, 2021, the entire contents of which are incorporated herein by reference.

FIELD

The embodiment discussed herein is related to a signal processing device and a transmission device.

BACKGROUND

In digital coherent transmission, for example, a receiver converts a received optical signal into an electric field signal, and compensates the electric field signal for polarization mode dispersion, polarization fluctuation, and the like of the optical signal that occurred in a transmission channel by adaptive equalization processing. In the adaptive equalization processing, arithmetic processing using multiple tap coefficients is executed on the electric field signal. Since the tap coefficients are updated, for example, cyclically during reception of an optical signal, appropriate initial values have to be set at start-up of the receiver.

Japanese Laid-open Patent Publication No. 2012-248944 is disclosed as related art.

Meng Yan et al., "Experimental Investigation of Training Sequence for Adaptive Equalizer Initialization in DP-16QAM System", Tu.1.E.4, ECOC 2013 is also disclosed as related art.

SUMMARY

According to an aspect of the embodiments, a signal processing device includes: a memory; and a processor coupled to the memory and configured to: compensate an electric field signal representing an electric field component in an optical signal input from a transmission channel for an optical frequency offset between light sources on a transmission side and a reception side of the optical signal based on a compensation value; calculate an estimated value of the optical frequency offset from data having a fixed pattern in the electric field signal; generate a plurality of candidates for the compensation value from the estimated value; calculate power of the optical signal compensated for the optical frequency offset based on each of the plurality of candidates; and select an initial value of the compensation value from the plurality of candidates based on the power of the optical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An optical frequency offset exists between a light source on a transmission side of an optical signal and a light source on a reception side of the optical signal (for example, a local oscillation light source). For this reason, the receiver compensates for the optical frequency offset in an optical signal and performs demodulation processing on the signal. Here, the estimated value of the optical frequency offset is used for initial setting of tap coefficients.

However, the receiver fails to correctly estimate the optical frequency offset at start-up if the optical frequency offset exceeds an estimable range. To address this, the optical frequency offset may be reduced to the estimable range by finely adjusting the optical frequency of the light source on the reception side in accordance with the optical frequency of the light source on the transmission side. However, this method has a problem that it takes time and effort to adjust the optical frequency at start-up of the receiver.

Under these circumstance, an object of the disclosure is to provide a signal processing device and a transmission device that are capable of compensating for a wide range of an optical frequency offset.

(Optical Transmission System)

Figure 1:
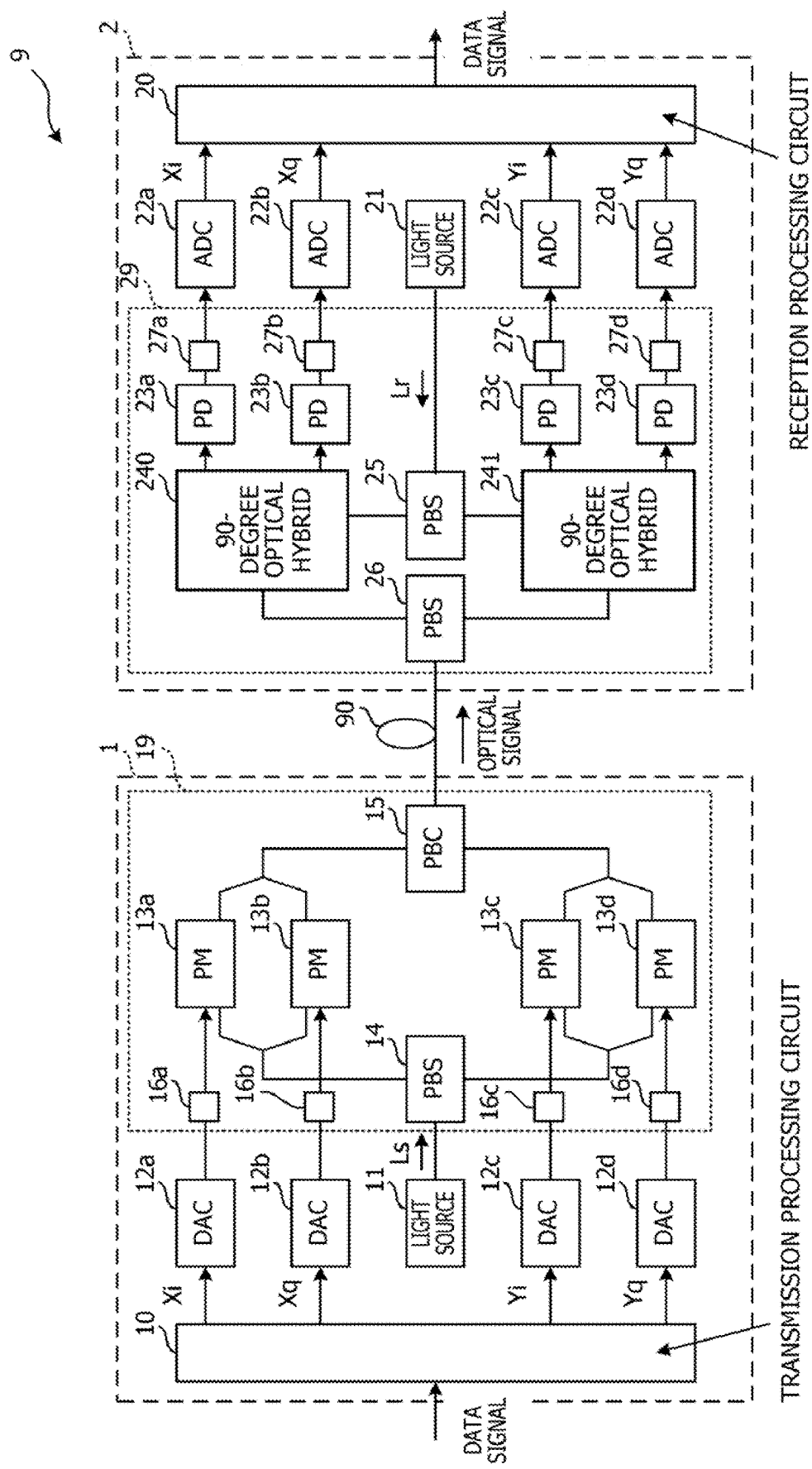
FIG. 1 is a configuration diagram illustrating an example of a transmission system.

FIG. 1 is a configuration diagram illustrating an example of an optical transmission system 9. The optical transmission system 9 includes a transmitter 1 and a receiver 2 coupled to each other through a transmission channel 90 such as an optical fiber. The receiver 2 is an example of a transmission device. The transmitter 1 transmits an optical signal to the receiver 2 in accordance with a digital coherent optical transmission method, and the receiver 2 receives the optical signal transmitted from the transmitter 1 via the transmission channel 90.

The transmitter 1 generates an optical signal in which an X-polarized wave and a Y-polarized wave in quadrature with each other are synthesized from a data signal contained in an Ethernet (registered trademark) frame or the like. The transmitter 1 includes a transmission processing circuit 10, a light source 11, digital-to-analog converters (DACs) 12a to 12d, and an optical transmission unit 19. The optical transmission unit 19 includes drivers 16a to 16d, phase modulators (PMs) 13a to 13d, a polarization beam splitter (PBS) 14, and a polarization beam combiner (PBC) 15. The optical transmission unit 19 transmits an optical signal to the transmission channel 90.

The transmission processing circuit 10 modulates a data signal input from a different device in accordance with a multilevel modulation method (hereafter referred to as a modulation method) such as 64 quadrature amplitude modulation (QAM) to generate electric field signals Xi, Xq, Yi, and Yq and outputs the electric field signals Xi, Xq, Yi, and Yq to the DACs 12a to 12d, respectively. The electric field signals Xi, Xq, Yi, and Yq represent electric field components of respective polarized waves of an optical signal. The electric field signals Xi and Xq are an I-component and a Q-component of the X-polarized wave of the optical signal, respectively, and the electric field signals Yi and Yq are an I-component and a Q-component of the Y-polarized wave of the optical signal, respectively.

The transmission processing circuit 10 is, but not limited to, for example, a digital signal processor (DSP) and may be, for example, a field-programmable gate array (FPGA) or an application-specific integrated circuit (ASIC). The transmission processing circuit 10 may be a central processing unit (CPU) circuit that executes predetermined functions by way of software.

The DACs 12a to 12d convert the electric field signals Xi, Xq, Yi, and Yq from the digital signals to analog signals, respectively. The electric field signals Xi, Xq, Yi, and Yq are input to the PMs 13a to 13d, respectively. The DACs 12a to 12d may be built in the transmission processing circuit 10.

The light source 11 is, for example, a laser diode (LD), and outputs transmission light Ls at a predetermined frequency to the PBS 14. The PBS 14 splits the transmission light Ls into polarized components of an X-axis and a Y-axis (polarization axes). The X-polarized component of the transmission light Ls is input to both of the PMs 13a and 13b, and the Y-polarized component of the transmission light Ls is input to both of the PMs 13c and 13d. Here, the light source 11 is an example of a second light source on a transmission side of an optical signal.

The drivers 16a to 16d drive the PMs 13a to 13d based on the analog signals input from the DACs 12a to 12d, respectively.

The PMs 13a to 13d optically modulate the transmission light Ls based on the electric field signals Xi, Xq, Yi, and Yq converted into the analog signals, respectively. For example, the PMs 13a and 13b phase-modulate the X-polarized wave of the transmission light Ls based on the electric field signals Xi and Xq, respectively, and the PMs 13c and 13d phase-modulate the Y-polarized wave of the transmission light Ls based on the electric field signals Yi and Yq, respectively. The phase-modulated X-polarized component and Y-polarized component of the transmission light Ls are input to the PBC 15. The PBC 15 combines the X-polarized component and the Y-polarized component of the transmission light Ls and outputs the combined components as an optical signal to the transmission channel 90.

The receiver 2 receives the optical signal from the transmitter 1. The receiver 2 includes a reception processing circuit 20, a light source 21, analog-to-digital converters (ADCs) 22a to 22d, and an optical reception unit 29.

The optical reception unit 29 serves as an optical front end, includes photo diodes (PDs) 23a to 23d, 90-degree optical hybrid circuits 240 and 241, PBSs 25 and 26, and transimpedance amplifiers (TIAs) 27a to 27d, and receives the optical signal from the transmission channel 90. The PBS 26 splits the optical signal input from the transmission channel 90 into an X-polarized component and a Y-polarized component, and outputs the X-polarized component and the Y-polarized component to the 90-degree optical hybrid circuits 240 and 241, respectively.

The light source 21 inputs local oscillation light Lr to the PBS 25. The PBS 25 splits the local oscillation light Lr into an X-polarized component and a Y-polarized component and outputs these components to the 90-degree optical hybrid circuits 240 and 241, respectively. The light source 21 is an example of a light source on a reception side of an optical signal and is an example of a first light source that outputs local oscillation light.

The 90-degree optical hybrid circuit 240 detects the X-polarized component of the optical signal by using a waveguide that causes the X-polarized component of the optical signal and the X-polarized component of the local oscillation light Lr to interfere with each other. The 90-degree optical hybrid circuit 240 outputs, as the detection results, optical electric field components according to the amplitudes and phases of an I channel and a Q channel to the PDs 23a and 23b, respectively.

The 90-degree optical hybrid circuit 241 detects the Y-polarized component of the optical signal by using a waveguide that causes the Y-polarized component of the optical signal and the Y-polarized component of the local oscillation light Lr to interfere with each other. The 90-degree optical hybrid circuit 241 outputs, as the detection results, optical electric field components according to the amplitudes and phases of the I channel and the Q channel to the PDs 23c and 23d, respectively.

The PDs 23a to 23d convert the optical electric field components into current signals and outputs the current signals to the TIAs 27a to 27d, respectively. The TIAs 27a to 27d convert the current signals into voltage signals and outputs the voltage signals to the ADCs 22a to 22d, respectively. The voltage signals are an example of electric signals.

As described above, the optical reception unit 29 detects an optical signal input from the transmission channel 90 with the local oscillation light Lr to convert the optical signal into the electric signals, and receives the electric signals. The optical reception unit 29 is an example of a reception unit.

The ADCs 22a to 22d convert the current signals input from the PDs 23a to 23d into the electric field signals Xi, Xq, Yi, and Yq, respectively. The electric field signals Xi, Xq, Yi, and Yq are input to the reception processing circuit 20. The ADCs 22a to 22d are an example of a conversion unit that converts electric signals into electric field signals Xi, Xq, Yi, and Yq.

The reception processing circuit 20 performs demodulation processing of the data signal. For example, the reception processing circuit 20 performs adaptive equalization processing on the electric field signal Xi, Xq, Yi, and Yq to make compensation for IQ distortion caused in the transmitter 1 and the receiver 2, compensation for waveform distortion caused in the optical signal due to polarization mode dispersion or polarization dependent loss in the transmission channel 90, and the like.

The reception processing circuit 20 is an example of a signal processing device. The reception processing circuit 20 is, but not limited to, for example, a DSP, and may be, for example, an FPGA or ASIC. The reception processing circuit 20 may be a central processing unit (CPU) circuit that executes predetermined functions by way of software.

In the adaptive equalization processing by the reception processing circuit 20, arithmetic processing using multiple tap coefficients is executed on the electric field signals Xi, Xq, Yi, and Yq. Since the tap coefficients are updated, for example, cyclically during reception of an optical signal, appropriate initial values have to be set at start-up of the receiver 2.

An optical frequency offset exists between the light source 11 on the transmission side and the light source 21 on the reception side of the optical signal. For this reason, the receiver 2 compensates for the optical frequency offset in the optical signal and performs the demodulation processing of the data signal. The receiver 2 estimates the optical frequency offset and makes initial setting of tap coefficients by using tap coefficients calculated from the estimated value of the optical frequency offset. An example of an optical frequency offset will be described below.

Example of Optical Frequency Offset

Figure 2:
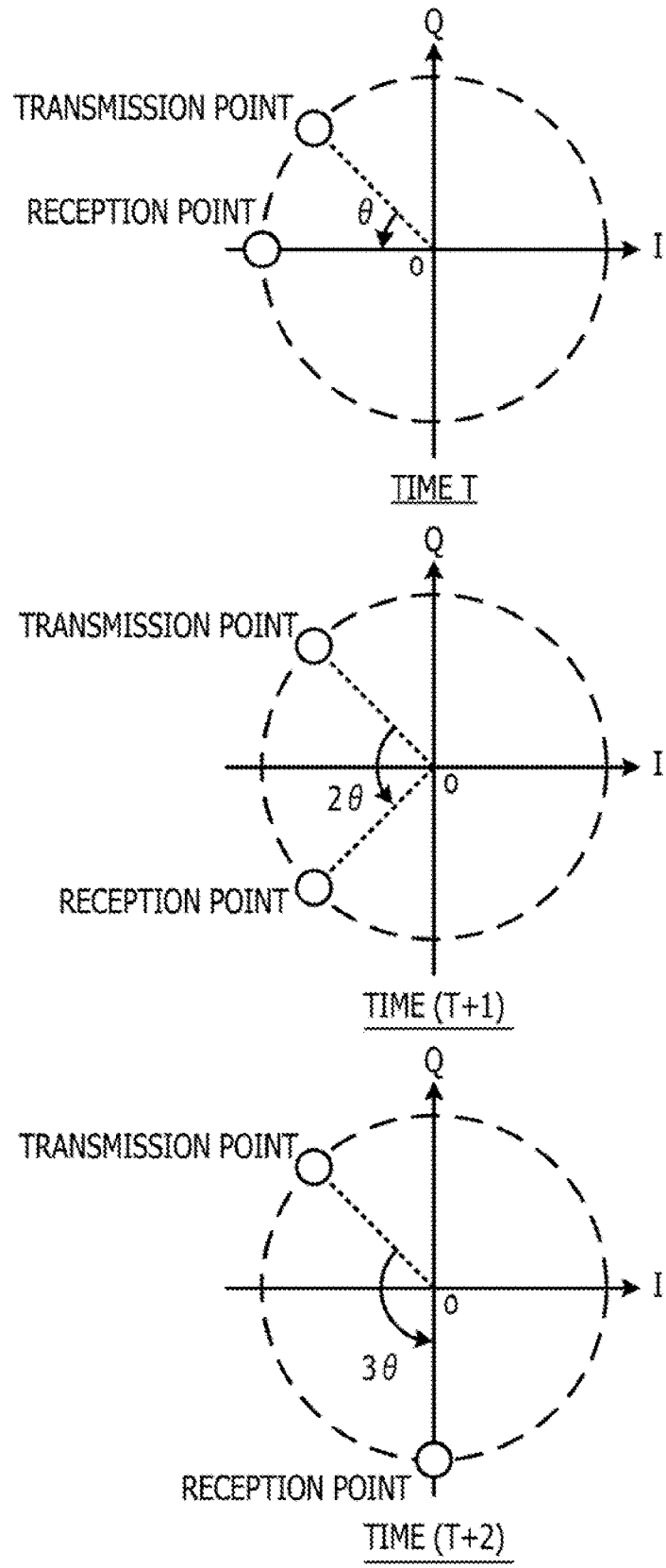
FIG. 2. is a diagram illustrating an example of an optical frequency offset having a phase difference of less than 2n.

FIG. 2 is a diagram illustrating an example of an optical frequency offset having a phase difference of less than 2n. The following example will be explained by using signal points (transmission points) of an optical signal on a transmission side and signal points (reception points) of the optical signal on a reception side in an IQ plane at times T, T+1, and T+2. Each of the times T, T+1, and T+2 is a time shifted by one symbol of the optical signal.

At the time T, the reception point is out of phase by an angle θ (<n/2) with respect to the transmission point. At the next time (T+1), the reception point is out of phase by an angle 2θ with respect to the transmission point. At the next time (T+2), the reception point is out of phase by an angle 3θ with respect to the transmission point. In this way, the optical frequency offset increases with the passage of time. In a case where the phase difference between the transmission point and the reception point is less than 2n, it is possible to detect the optical frequency offset by, for example, a method using training sequence signals disclosed in Meng Yan et al.

Figure 3:
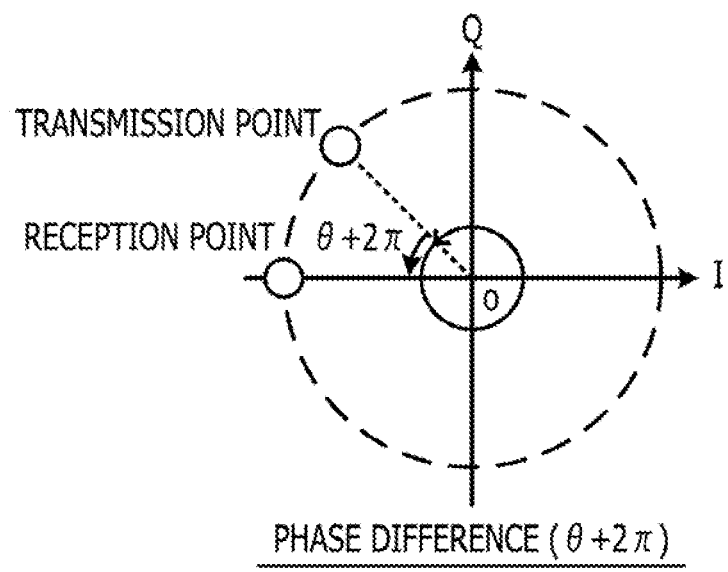
FIG. 3. is a diagram illustrating an example of an optical frequency offset having a phase difference exceeding 2n.
Figure 3:
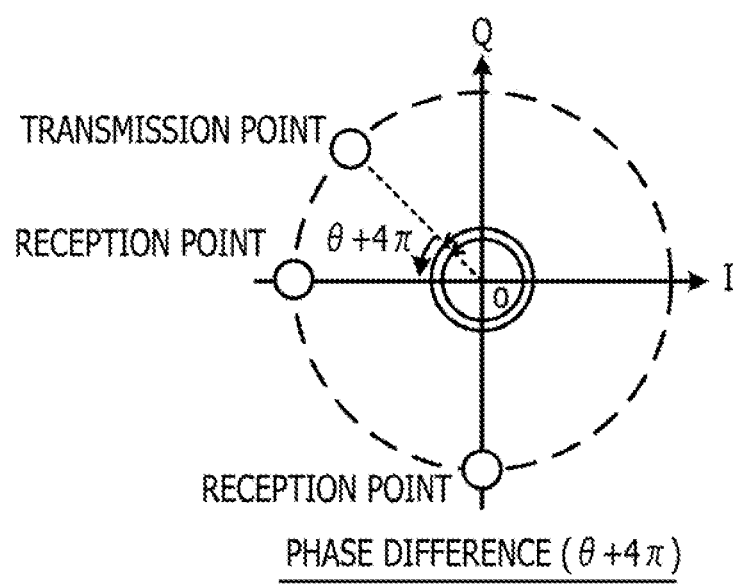

FIG. 3 is a diagram illustrating an example of an optical frequency offset having a phase difference exceeding 2n. For example, in a case where a phase difference between the transmission point and the reception point in an interval between the cyclic training sequence signals is θ+2n or θ+4n, the phase difference exceeds the range detectable by the above-described method.

Comparative Example of Scheme for Compensating for Optical Frequency Offset

As a scheme for compensating for an optical frequency offset, for example, there is a method using a power spectrum on a frequency axis of an optical signal. However, the power spectrum of the optical signal is degraded due to the influence of an optical filter on the reception side or the like as will be described below. When the degradation is at a certain degree, it is difficult to compensate for the optical frequency offset.

Figure 4:
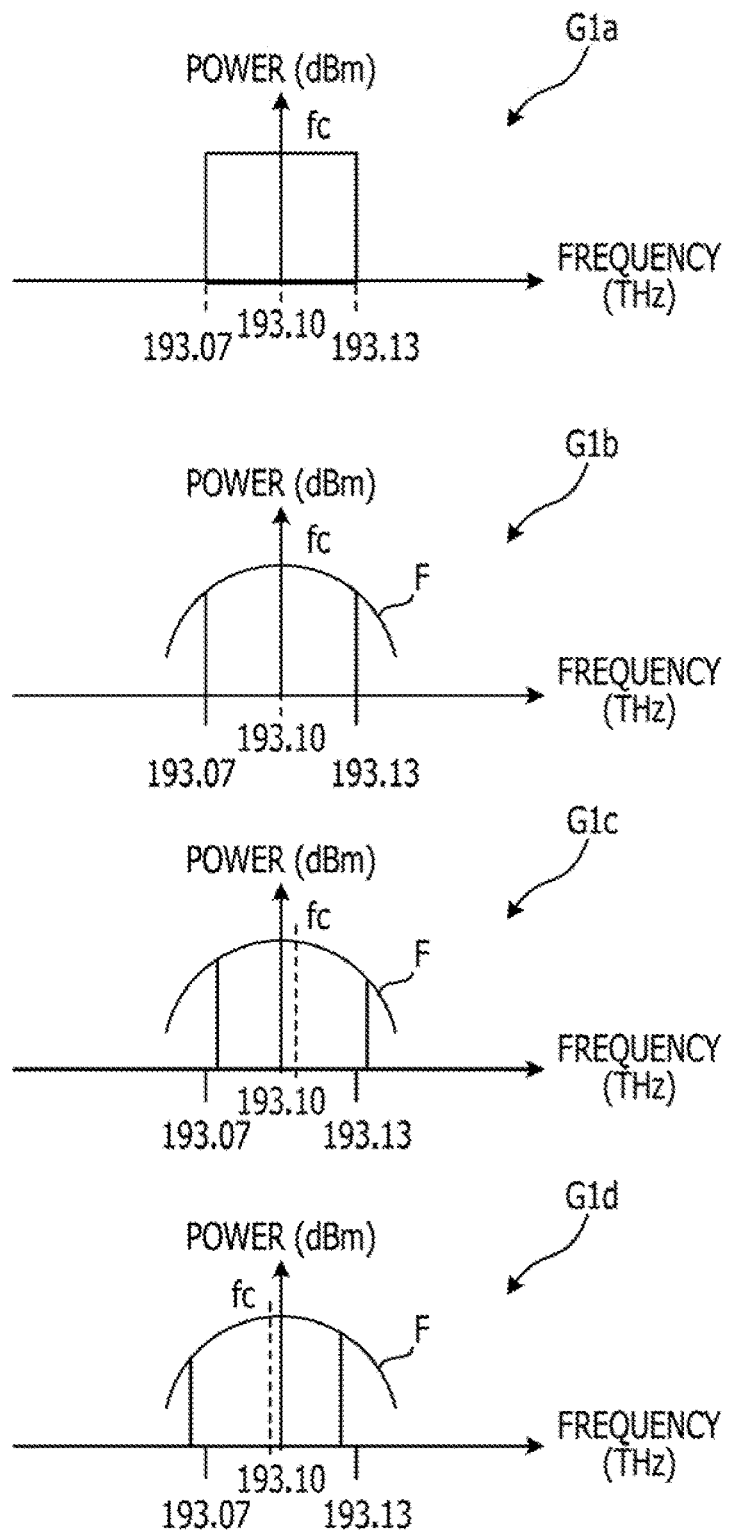
FIG. 4. is a diagram illustrating an example of degradation in a power spectrum of an optical signal.

FIG. 4 is a diagram illustrating an example of degradation of a power spectrum of an optical signal. In this example, the center frequency of the optical signal is 193.10 (THz) and the frequency bandwidth of the optical signal is 64 (GHz).

Reference sign G1a presents an ideal power spectrum of an optical signal. The signal bandwidth of the optical signal is 193.07 to 193.13 (THz). Reference sign G1b presents a power spectrum of an optical signal transmitted through an optical filter in a case where the center frequency of the optical signal is not shifted. Here, reference sign F presents a transmission shape of the optical filter. In this case, the center frequency of the optical filter substantially coincides with the peak of the power, and therefore it is easy to compensate for the optical frequency offset.

Reference sign G1c presents a power spectrum of an optical signal transmitted through the optical filter in a case where the center frequency of the optical signal is shifted to a high frequency side. Reference sign G1d presents a power spectrum of an optical signal transmitted through the optical filter in a case where the center frequency of the optical signal is shifted to a low frequency side. In the case where the center frequency is shifted as described above, the center frequency of the optical filter does not coincide with the peak of the power, and therefore it is difficult to compensate for the optical frequency offset.

In the present embodiment, the reception processing circuit 20 estimates the optical frequency offset by using synchronization training sequence signals cyclically included in an optical signal, and generates, from the estimated value, multiple candidates for an initial value of a compensation value for the optical frequency offset.

(Configuration of Transmission Processing Circuit)

Figure 5:
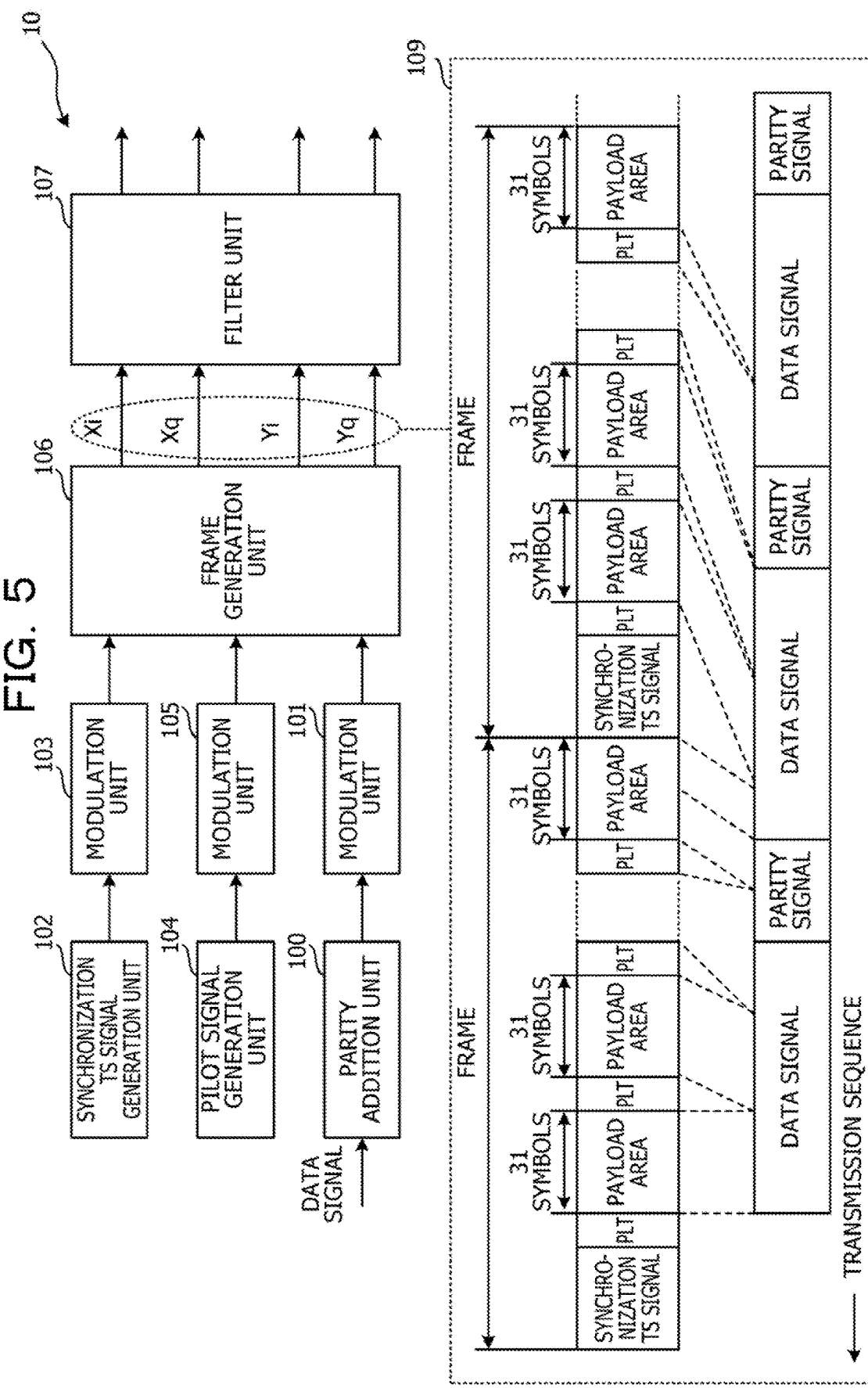
FIG. 5 is a configuration diagram illustrating an example of a transmission processing circuit.

FIG. 5 is a configuration diagram illustrating an example of the transmission processing circuit 10. The transmission processing circuit 10 includes a parity addition unit 100, modulation units 101, 103, and 105, a synchronization training sequence (synchronization TS) signal generation unit 102, a pilot signal generation unit 104, a frame generation unit 106, and a filter unit 107.

The parity addition unit 100 encodes a data signal to generate an error correction code for, for example, forward error correction (FEC) or the like.

The parity addition unit 100 adds the error correction code as parity signals to the data signal and outputs the resultant signals to the modulation unit 101. The modulation unit 101 modulates the data signal and the parity signals in accordance with, for example, quadrature amplitude modulation (QAM) and outputs the modulated signal to the frame generation unit 106.

The synchronization TS signal generation unit 102 generates a synchronization TS signal having a fixed pattern and outputs the synchronization TS signal to the modulation unit 103. The modulation unit 103 modulates the synchronization TS signal by, for example, quadrature phase shift keying (QPSK) and outputs the modulated synchronization TS signal to the frame generation unit 106. The synchronization TS signal is an example of data having a fixed pattern.

The pilot signal generation unit 104 generates a pilot signal having a fixed pattern and outputs the pilot signal to the modulation unit 105. For example, the modulation unit 105 modulates the pilot signal by QPSK, and outputs the pilot signal to the frame generation unit 106.

As illustrated with reference sign 109, the frame generation unit 106 generates frames from the synchronization TS signal, the data signal, the parity signals, and the pilot signal (PLT). The synchronization TS signal is arranged at the head of each frame. The reception processing circuit 20 uses the synchronization TS signal for frame synchronization and compensation for an optical frequency offset. The pilot signals and payload areas are alternately arranged after the synchronization TS signal in the frame. The reception processing circuit 20 uses the pilot signals to determine tap coefficients for the adaptive equalization processing. Each of the payload areas is, for example, an area for 31 symbols. In this case, the pilot signals are arranged at intervals of 32 symbols. The data signal and the parity signals are divided and contained in multiple payload areas. The reception processing circuit 20 uses the parity signals for error correction of the data signal.

The frame generation unit 106 outputs the frames as the electric field signals Xi, Xq, Yi, and Yq to the filter unit 107. The filter unit 107 includes, for example, a Nyquist filter and shapes the waveforms of the electric field signals Xi, Xq, Yi, and Yq.

(Configuration of Reception Processing Circuit)

Figure 6:
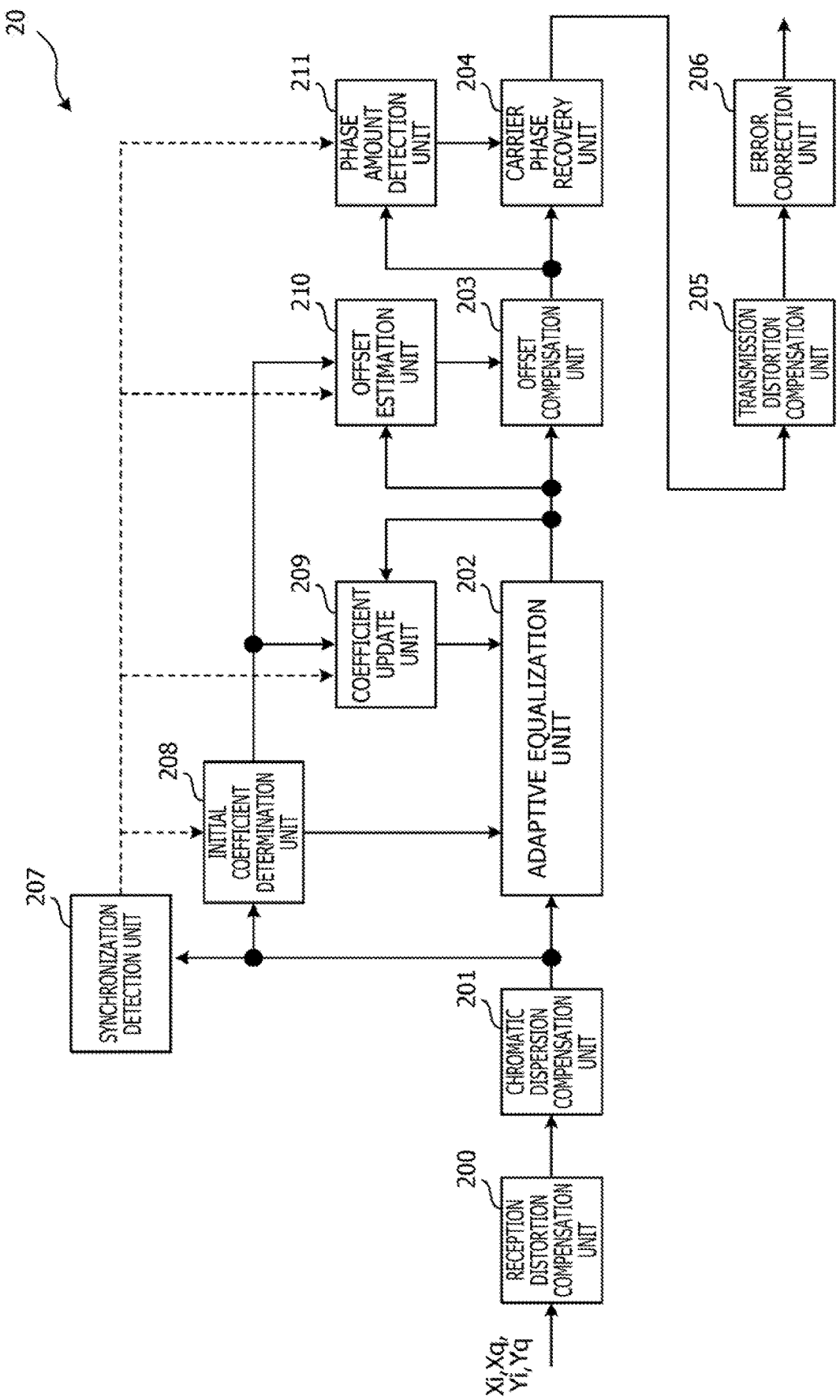
FIG. 6 is a configuration diagram illustrating an example of a reception processing circuit.

FIG. 6 is a configuration diagram illustrating an example of the reception processing circuit 20. The reception processing circuit 20 includes a reception distortion compensation unit 200, a chromatic dispersion compensation unit 201, an adaptive equalization unit 202, an offset compensation unit 203, a carrier phase recovery unit 204, a transmission distortion compensation unit 205, an error correction unit 206, a synchronization detection unit 207, an initial coefficient determination unit 208, a coefficient update unit 209, an offset estimation unit 210, and a phase amount detection unit 211.

The reception distortion compensation unit 200 compensates the electric field signals Xi, Xq, Yi, and Yq for degradation of the optical signal caused by IQ imbalance in the receiver 2. The reception distortion compensation unit 200 outputs the compensated electric field signals Xi, Xq, Yi, and Yq to the chromatic dispersion compensation unit 201.

The chromatic dispersion compensation unit 201 compensates the electric field signals Xi, Xq, Yi, and Yq for degradation of the optical signal caused by dispersion in the transmission channel 90. The chromatic dispersion compensation unit 201 outputs the compensated electric field signals Xi, Xq, Yi, and Yq to the adaptive equalization unit 202.

The adaptive equalization unit 202 performs the adaptive equalization processing on the electric field signals Xi, Xq, Yi, and Yq to compensate for waveform distortion generated in the optical signal due to polarization mode dispersion or polarization dependent loss in the transmission channel 90. The adaptive equalization unit 202 performs the adaptive equalization processing according to the tap coefficients of a finite impulse response (FIR) filter. The adaptive equalization unit 202 is an example of an adaptive equalization compensation unit that performs adaptively equalize on the electric field signals Xi, Xq, Yi, and Yq in accordance with the tap coefficients to compensate for degradation caused in the optical signal in the transmission channel 90. The tap coefficients are an example of filter coefficients.

The coefficient update unit 209 updates the tap coefficients in accordance with a constant modus algorithm (CMA) method or the like using the pilot signals in the electric field signals Xi, Xq, Yi, and Yq output from the adaptive equalization unit 202. The electric field signals Xi, Xq, Yi, and Yq are output from the adaptive equalization unit 202 to the offset compensation unit 203 and the offset estimation unit 210.

The offset compensation unit 203 is an example of a compensation unit and compensates the electric field signals Xi, Xq, Yi, and Yq based on a compensation value for an optical frequency offset between the light sources 11 and 21 on the transmission side and the reception side. The offset estimation unit 210 calculates the compensation value by estimating an optical frequency offset from the electric field signals Xi, Xq, Yi, and Yq input to the offset compensation unit 203. The offset estimation unit 210 outputs the compensation value to the offset compensation unit 203. The electric field signals Xi, Xq, Yi, and Yq are output from the offset compensation unit 203 to the carrier phase recovery unit 204 and the phase amount detection unit 211.

The carrier phase recovery unit 204 removes phase noise components of the local oscillation light Lr from the electric field signals Xi, Xq, Yi, and Yq. The phase amount detection unit 211 detects phase noise from the electric field signals Xi, Xq, Yi, and Yq input to the carrier phase recovery unit 204, and outputs the phase noise to the carrier phase recovery unit 204. The electric field signals Xi, Xq, Yi, and Yq are output from the carrier phase recovery unit 204 to the transmission distortion compensation unit 205.

The transmission distortion compensation unit 205 compensates the electric field signals Xi, Xq, Yi, and Yq for degradation of the optical signal caused by IQ imbalance in the transmitter 1. The transmission distortion compensation unit 205 outputs the compensated electric field signals Xi, Xq, Yi, and Yq to the error correction unit 206.

The error correction unit 206 extracts the parity signals from the electric field signals Xi, Xq, Yi, and Yq and performs error correction on the data signal based on the parity signals.

The synchronization detection unit 207 extracts the synchronization training sequence signals from the electric field signals Xi, Xq, Yi, and Yq output from the chromatic dispersion compensation unit 201 to the adaptive equalization unit 202 and establishes frame synchronization. As indicated by a dotted line, the synchronization detection unit 207 notifies the initial coefficient determination unit 208, the coefficient update unit 209, the offset estimation unit 210, and the phase amount detection unit 211 of a synchronization timing. The initial coefficient determination unit 208, the coefficient update unit 209, the offset estimation unit 210, and the phase amount detection unit 211 control a processing timing of the electric field signals Xi, Xq, Yi, and Yq based on the synchronization timing.

At start-up of the receiver 2, the initial coefficient determination unit 208 estimates the optical frequency offset from the synchronization training sequence signals in the electric field signals Xi, Xq, Yi, and Yq, selects an initial value of the compensation value for the optical frequency offset from multiple candidates generated from the estimated value of the optical frequency offset, and sets the selected initial value in the offset estimation unit 210. The initial coefficient determination unit 208 determines initial values of the tap coefficients from the initial value of the compensation value for the optical frequency offset, and sets the initial values of the tap coefficients in the adaptive equalization unit 202 and the coefficient update unit 209.

Figure 7:
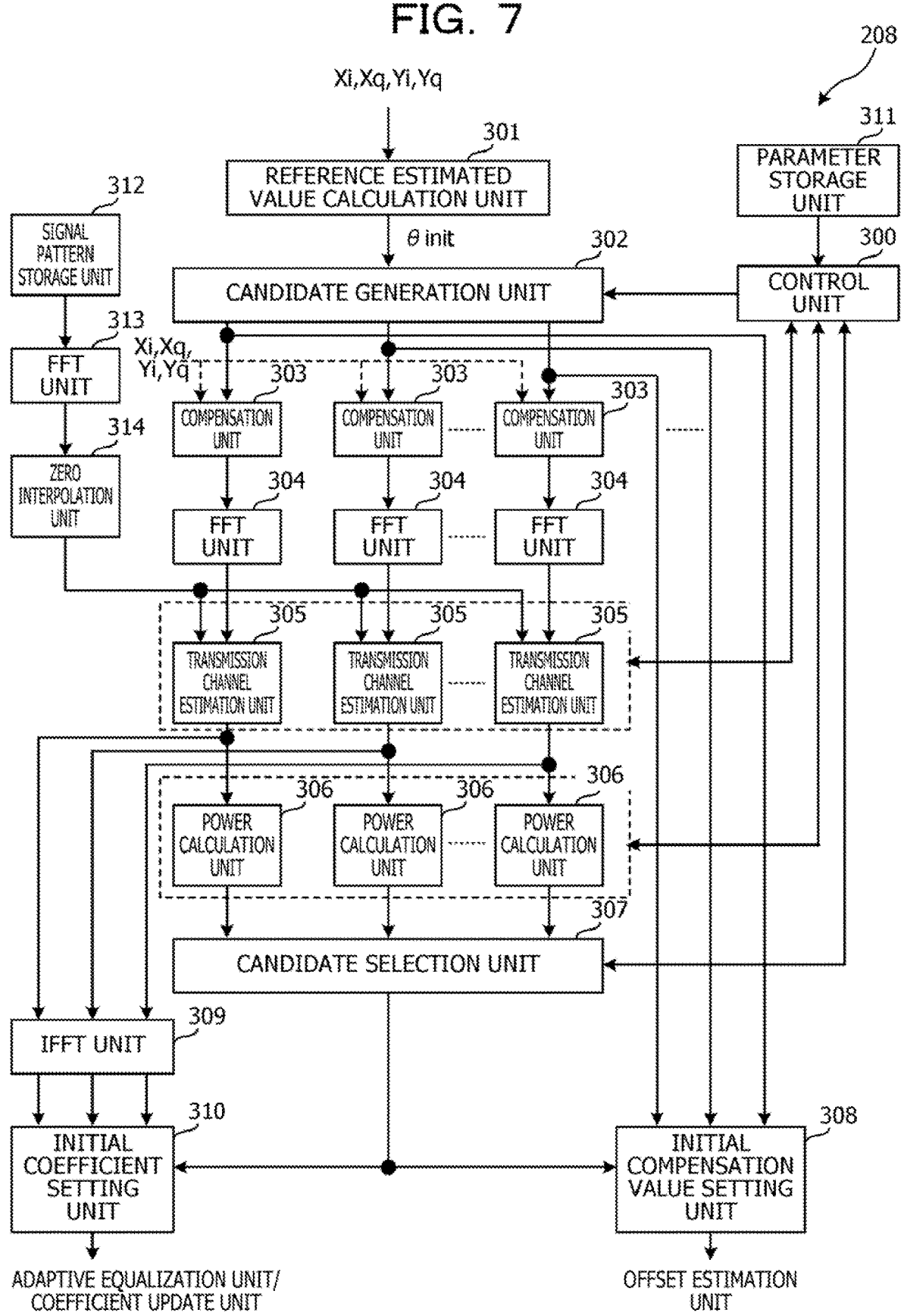
FIG. 7 is a configuration diagram illustrating an example of an initial coefficient determination unit.

FIG. 7 is a configuration diagram illustrating an example of the initial coefficient determination unit 208. The initial coefficient determination unit 208 includes a control unit 300, a reference estimated value calculation unit 301, a candidate generation unit 302, multiple compensation units 303, multiple fast Fourier transformation (FFT) units 304, multiple transmission channel estimation units 305, multiple power calculation units 306, and a candidate selection unit 307. The initial coefficient determination unit 208 further includes an initial compensation value setting unit 308, an inverse fast Fourier transformation (IFFT) unit 309, an initial coefficient setting unit 310, a parameter storage unit 311, a signal pattern storage unit 312, an FFT unit 313, and a zero interpolation unit 314.

The reference estimated value calculation unit 301 is an example of an estimation unit, and calculates an estimated value θinit of the optical frequency offset from the synchronization TS signals in the electric field signals Xi, Xq, Yi, and Yq. This estimated value θinit is a reference value (hereinafter, referred to as a reference estimated value θinit) for generating multiple candidates for the initial value of the compensation value to be set in the offset estimation unit 210.

Figure 8:
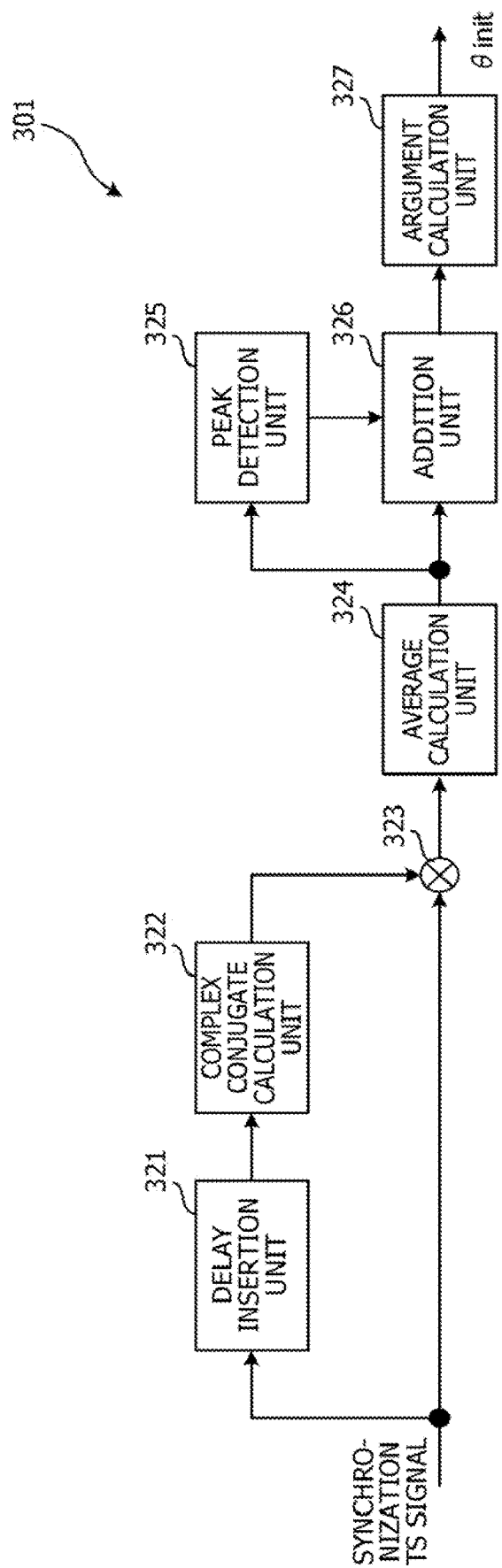
FIG. 8 is a configuration diagram illustrating an example of a reference estimated value calculation unit.

FIG. 8 is a configuration diagram illustrating an example of the reference estimated value calculation unit 301. The reference estimated value calculation unit 301 includes a delay insertion unit 321, a complex conjugate calculation unit 322, a multiplier 323, an average calculation unit 324, a peak detection unit 325, an addition unit 326, and an argument calculation unit 327.

The synchronization TS signal is input to the delay insertion unit 321 and the multiplier 323. The delay insertion unit 321 delays the synchronization TS signal by the number of symbols per cycle (for example, 11 symbols) and outputs the delayed synchronization TS signal to the complex conjugate calculation unit 322. The complex conjugate calculation unit 322 calculates a complex conjugate of the synchronization TS signal and outputs the complex conjugate to the multiplier 323.

The multiplier 323 multiplies the synchronization TS signal by the complex conjugate of the synchronization TS signal. For example, the multiplier 323 calculates an autocorrelation of the synchronization TS signal. As a result, a phase difference by using the synchronization TS signals is calculated. The multiplier 323 outputs the multiplication result to the average calculation unit 324. The average calculation unit 324 calculates a moving average of the multiplication results in the number of symbols per cycle, and outputs the moving average to the peak detection unit 325 and the addition unit 326.

The peak detection unit 325 detects a position of a peak based on the moving average values and notifies the addition unit 326 of the detected position. The addition unit 326 calculates the sum of the moving average values at the peak positions and outputs the sum to the argument calculation unit 327. The argument calculation unit 327 calculates the reference estimated value θinit by calculating an argument of the sum of the moving average values and dividing the argument by the number of symbols per cycle.

$$-Sr/(2\times L) < \theta init \leq Sr/(2\times L) \quad (1)$$

A range of the reference estimated value θinit is equivalent to a phase range from −n to +n, and thus is calculated in accordance with the above formula (1). In the formula (1), Sr denotes a symbol rate (GBaud), and L denotes an interval (the number of symbols per cycle) in the synchronization TS signals. Here, Sr/L is equivalent to a phase of 2n.

The reference estimated value calculation unit 301 is unable to estimate an optical frequency offset that exceeds the range defined in the formula (1). For this reason, the candidate generation unit 302 expands the estimable range by generating multiple candidates from the reference estimated value θinit as will be described below.

The description will be given by referring to FIG. 7 again. The reference estimated value calculation unit 301 outputs the reference estimated value θinit to the candidate generation unit 302.

The candidate generation unit 302 is an example of a generation unit, and generates, from the reference estimated value θinit multiple candidates for the initial value of the compensation value for the optical frequency offset to be set in the offset compensation unit 203. For example, the candidate generation unit 302 generates, as the candidates, the reference estimated value θinit and values (θinit±2n×n) each shifted from the reference estimated value θinit by an integer multiple of 2n. Here, the integer n is 1, 2, 3, . . . , Nmax (Nmax: an integer of 1 or more).

For example, when the maximum value Nmax of the integer n is 2, the candidate generation unit 302 generates five candidates of θinit, θinit±2n, and θinit±4n. The maximum value Nmax of the integer n is notified of by the control unit 300.

The control unit 300 calculates the maximum value Nmax from parameters read from the parameter storage unit 311. The parameter storage unit 311 is, for example, a memory circuit, and stores, in advance, a symbol rate of an optical signal, a symbol interval in synchronization TS signals, and a maximum frequency difference between the light sources 11 and 21 on the transmission side and the reception side (the maximum value of the difference between the center frequencies on the transmission light Ls and the local oscillation light Lr). Here, the parameter storage unit 311 may be provided in an external device. A calculation example of the maximum value Nmax will be described below.

For example, the description will be given of a case where the symbol rate of an optical signal is 64 (Gbaud), the symbol interval in the synchronization TS signals is 11 symbols, and the maximum frequency difference between the light sources 11 and 21 on the transmission side and the reception side is ±5.0 (GHz). The maximum frequency difference is determined based on the accuracy (for example, ±2.5 (GHz)) of the frequencies of the light sources 11 and 21. The control unit 300 calculates a range of the reference estimated value θinit to be calculated by the reference estimated value calculation unit 301 from the symbol rate of the optical signal and the symbol interval in the synchronization TS signals. In this example, the range of the reference estimated value θinit is −2.909 (GHz) (=±64/11/2) <θinit≤2.909 (GHz) from the above formula (1).

The control unit 300 determines the maximum value Nmax of the integer n by dividing the maximum frequency difference between the light sources 11 and 21 by the maximum value of the reference estimated value θinit which is the maximum value of the estimable optical frequency offset. When 5.0 (GHz), which is the maximum frequency difference between the light sources 11 and 21, is divided by 2.909 (GHz), which is the maximum value (absolute value) of the estimable optical frequency offset, 1.71 is obtained. Accordingly, the frequency amount corresponding to 1, which is the integer part of 1.71, is an estimation range to be expanded, and therefore the maximum value Nmax of the integer n is calculated as 1.

In this case, the candidate generation unit 302 generates the following candidates.

Candidate (A): a reference estimated value θinit+2n
Candidate (B): a reference estimated value θinit
Candidate (C): a reference estimated value θinit−2n In this way, the candidate generation unit 302 generates the multiple candidates (A) to (C) for the compensation value for the optical frequency offset by shifting the reference estimated value θinit within the range according to the accuracy of the center frequencies of the light sources 11 and 21 on the transmission side and the reception side. Thus, the candidate generation unit 302 is capable of generating candidates within an appropriate range according to the performance of the light sources 11 and 21 on the transmission side and the reception side. The determination of the range is not limited to the above and the candidate generation unit 302 may generate candidates within a predetermined range.

The ranges of the optical frequency offset estimable by using the candidates (A) to (C) are as follows based on −2.909 (GHz)<θinit≤2.909 (GHz). Here, 2n is 5.818 (=Sr/L=64/11).

An estimable range with the candidate (A): +2.909 to +(2.909+5.818) (GHz)

An estimable range with the candidate (B): −2.909 to +2.909 (GHz)

An estimable range with the candidate (C): −(2.909+5.818) to −2.909 (GHz)

Thus, even in the case where the maximum frequency difference between the light sources 11 and 21 exceeds the range of the reference estimated value θinit, the above expansion of the estimable range makes it possible to obtain an appropriate compensation value for the optical frequency offset.

The candidate generation unit 302 generates the multiple candidates for the compensation value for the optical frequency offset and outputs the multiple candidates to the multiple compensation units 303, respectively. For example, in the case of the reference estimated value θinit=1.367 (GHz), the above candidates (A) to (C) are as follows.

Candidate (A): 7.185 (GHz) (=θinit+2n=1.367+5.818)
Candidate (B): 1.367 (GHz)
Candidate (C): −4.451 (GHz) (=θinit−2n=1.367−5.818)

Each of the compensation units 303 compensates the synchronization TS signals in the electric field signals Xi, Xq, Yi, and Yq for the optical frequency offset based on the corresponding one of the candidates for the compensation value. Each of the compensation units 303 outputs the synchronization TS signal compensated for the optical frequency offset to the corresponding FFT unit 304.

Each of the FFT units 304 performs fast Fourier transformation on the synchronization TS signal to convert the synchronization TS signal from the signal on the time axis to signal on the frequency axis. Each of the FFT units 304 outputs the synchronization TS signal on the frequency axis to the corresponding transmission channel estimation unit 305.

Figure 9:
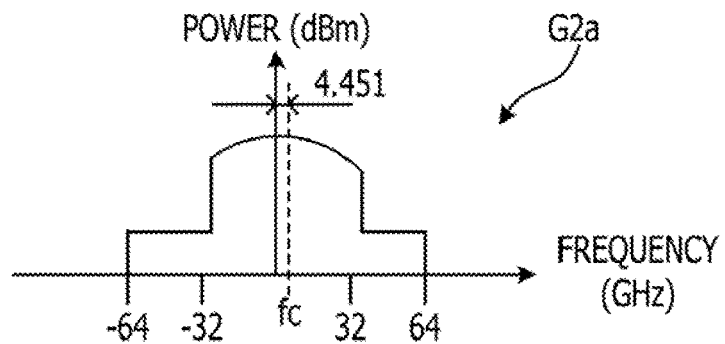
FIG. 9 is a diagram illustrating an example of power spectra of synchronization training sequence signals obtained by fast Fourier transformation.
Figure 9:
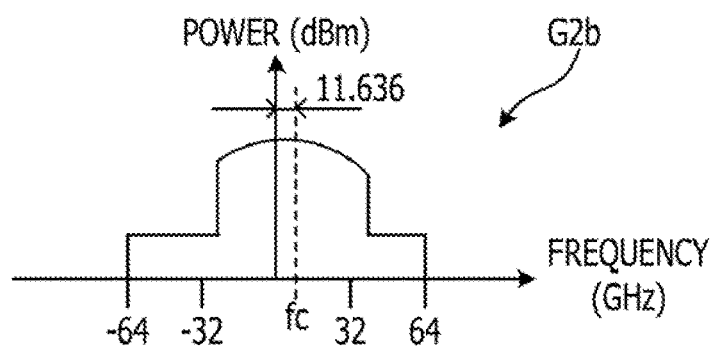
Figure 9:
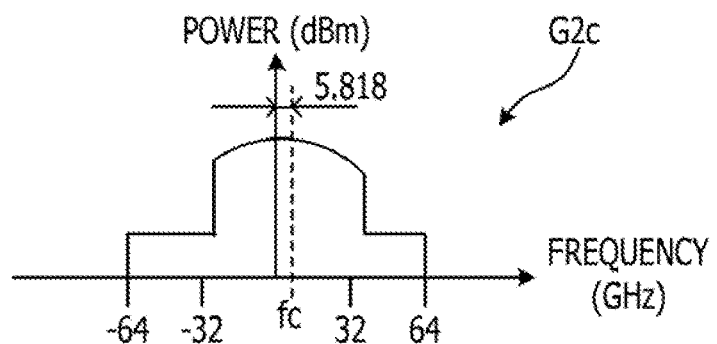
Figure 9:
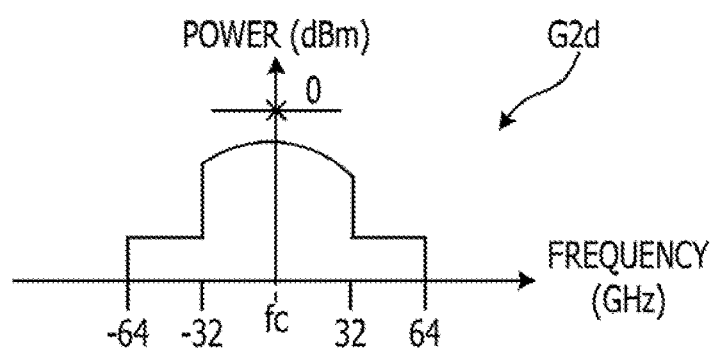

FIG. 9 is a diagram illustrating an example of power spectra of synchronization TS signals obtained by fast Fourier transformation. In graphs of reference signs G2a to G2d, the horizontal axis represents frequency (GHz), and the vertical axis represents power (dBm).

Reference sign G2a presents a power spectrum of a synchronization TS signal before the compensation for the optical frequency offset. As an example, the value of the optical frequency offset is assumed to be 4.451 (GHz). The symbol rate is assumed to be 64 (GHz). As compared with the center frequency in transmission, the center frequency is shifted by the value of the optical frequency offset.

Reference sign G2b presents a power spectrum of a synchronization TS signal compensated for the optical frequency offset based on the above candidate (A). As compared with the center frequency in transmission, the center frequency is shifted by the sum of the optical frequency offset and the value of the candidate (A) of 11.636 (GHz) (=4.451+7.185).

Reference sign G2c presents a power spectrum of a synchronization TS signal compensated for the optical frequency offset based on the above candidate (B). As compared with the center frequency in transmission, the center frequency is shifted by the sum of the optical frequency offset and the value of the candidate (B) of 5.818 (GHz) (=4.451+1.367).

Reference sign G2d presents a power spectrum of a synchronization TS signal compensated for the optical frequency offset based on the above candidate (C). Since the sum of the optical frequency offset and the value of the candidate (C) is equal to 0 (GHz) (=4.451−4.451), the center frequency is substantially the same as the center frequency in transmission. Accordingly, the candidate (C) is the optimum compensation value for the optical frequency offset.

Referring to FIG. 7 again, each of the transmission channel estimation units 305 performs transmission channel estimation processing from the synchronization TS signal on the frequency axis. Thus, each of the transmission channel estimation units 305 calculates the initial values of the tap coefficients for the adaptive equalization processing according to polarization.

A scheme for calculating the tap coefficients is a minimum mean square error method (MMSE). The transmission channel estimation unit 305 compares the synchronization TS signal compensated for the optical frequency offset by the corresponding one of the candidates (A) to (C) with the synchronization TS signal stored as an expected value in the signal pattern storage unit 312. As a result, the transmission channel estimation unit 305 is capable of obtaining a transmission channel estimation result according to a correlation value of the synchronization TS signal compensated for the optical frequency offset by the corresponding candidate (A) to (C) with the synchronization TS signal in the signal pattern storage unit 312.

The signal pattern storage unit 312 is, for example, a memory circuit, and stores therein an ideal synchronization TS signal in transmission. Here, the signal pattern storage unit 312 may be provided in an external device. The FFT unit 313 reads the synchronization TS signal from the signal pattern storage unit 312 and performs fast Fourier transformation thereon. In order to adjust a bandwidth of the synchronization TS signal after the fast Fourier transformation to a bandwidth of the synchronization TS signal compensated for the optical frequency offset, the zero interpolation unit 314 interpolates 0 into a bandwidth in the difference between these bandwidths. The zero interpolation unit 314 outputs the synchronization TS signal with the bandwidth thus interpolated to all the transmission channel estimation units 305.

Figure 10:
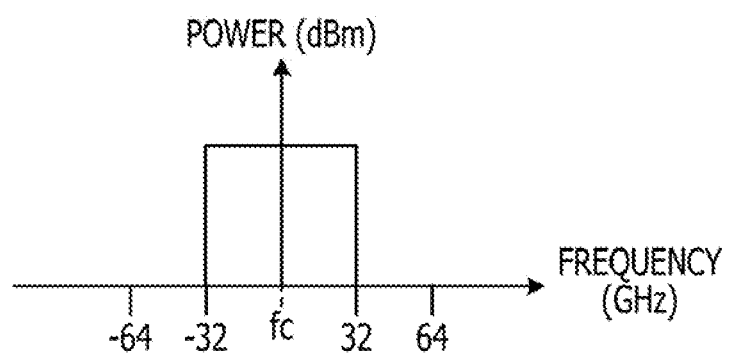
FIG. 10 is a diagram illustrating a power spectrum of a synchronization TS signal stored in a signal pattern storage unit.

FIG. 10 is a diagram illustrating a power spectrum of the synchronization TS signal stored in the signal pattern storage unit 312. The center frequency is the same as the center frequency of an optical signal in transmission. The symbol rate is 64 (GHz), which is the same as in the example described above.

Referring to FIG. 7 again, each of the power calculation units 306 calculates the power of the synchronization TS signal from the transmission channel estimation result input from the corresponding transmission channel estimation unit 305. For example, each of the power calculation units 306 converts the transmission channel estimation result into power to calculate a time average value, and calculates an average value of power in a bandwidth designated by the control unit 300. Each of the power calculation units 306 outputs the average value of the power to the candidate selection unit 307. The multiple power calculation units 306 are an example of a calculation unit that calculates the power of an optical signal compensated for an optical frequency offset by each of candidates.

The candidate selection unit 307 is an example of a selection unit, and selects the initial value of the compensation value for the optical frequency offset to be set in the offset compensation unit 203 from the multiple candidates based on the average values of the power input from the respective power calculation units 306. In a case where the optical frequency offset is compensated for based on an appropriate candidate, the average value of the power in a predetermined bandwidth is greater than that in a case where the optical frequency offset is compensated for based on another candidate. Accordingly, the candidate selection unit 307 selects the candidate having the highest power as the initial value of the compensation value, thereby enabling optimal compensation for the optical frequency offset.

Figure 11:
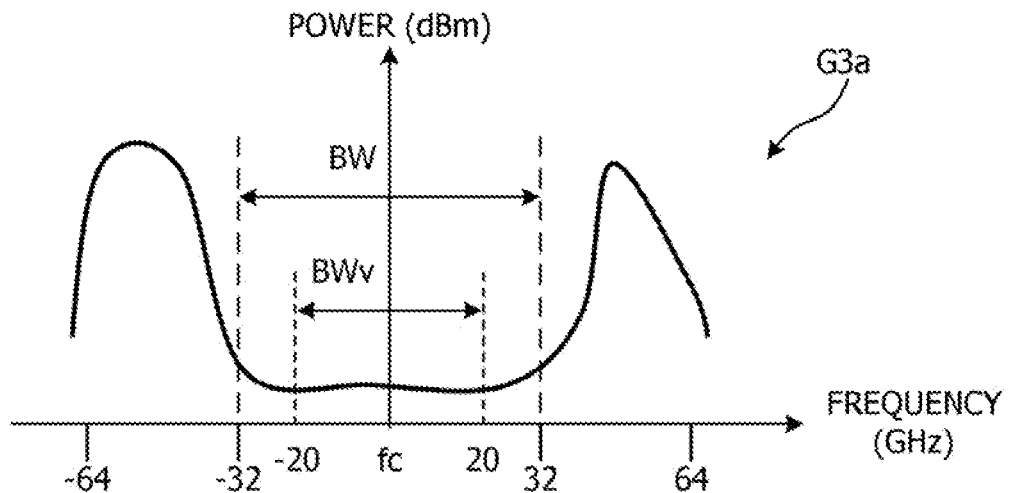
FIG. 11 is a diagram illustrating an example of frequency distributions of power obtained from transmission channel estimation results by a power calculation unit.
Figure 11:
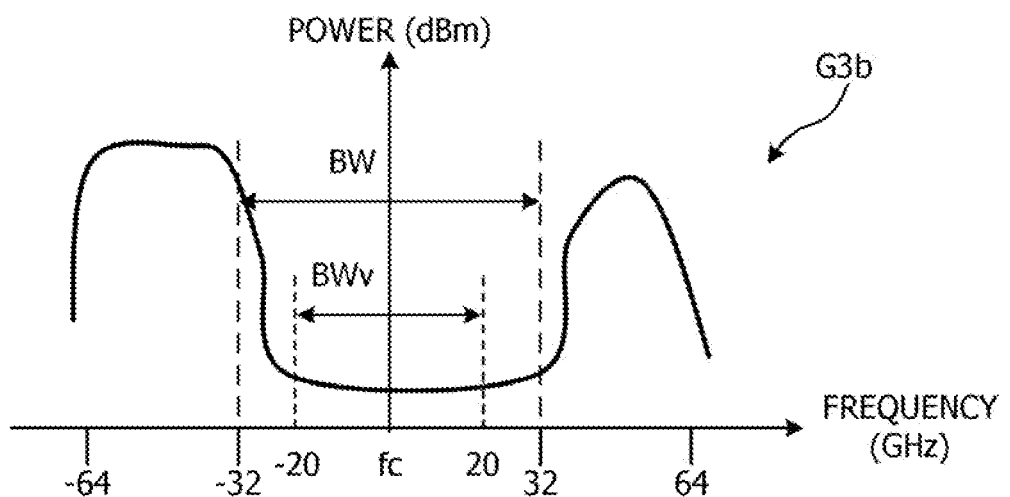
Figure 11:
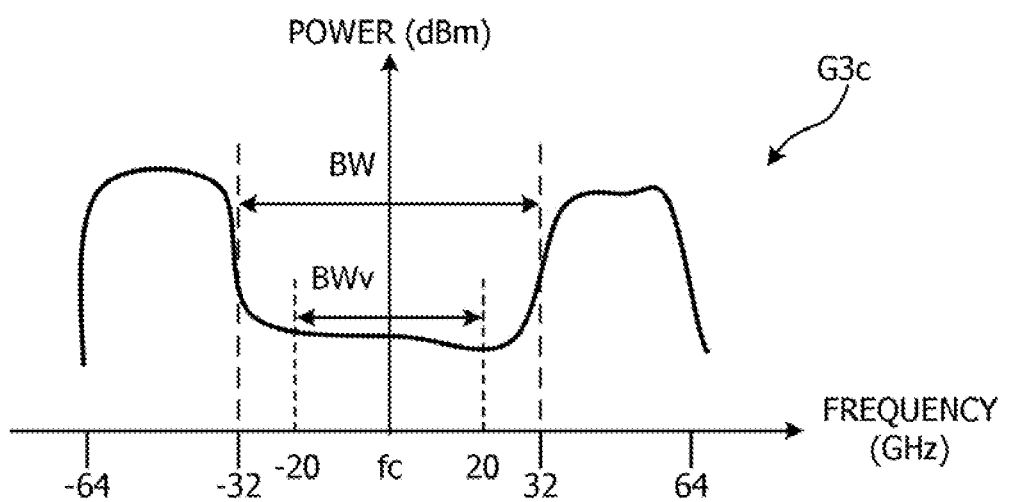

FIG. 11 is a diagram illustrating an example of frequency distributions of power obtained from transmission channel estimation results by the power calculation units 306. Reference signs G3a to G3c present power distributions for the above respective candidates (A) to (C).

The power calculation unit 306 calculates an average value of power in an evaluation target bandwidth BWv (−20 (GHz) to 20 (GHz)) designated by the control unit 300 in a signal bandwidth BW of 64 (GHz) (−32 (GHz) to 32 (GHz)). For example, the control unit 300 designates a center region of the signal bandwidth BW as the evaluation target bandwidth BWv so as to reduce noise and the influence of the optical frequency offset in the transmission channel estimation.

In this example, the symbol rate of 64 (GHz) may result in a frequency deviation of about ±11.7 (GHz). For this reason, in a frequency region higher than ±20.3 (GHz), there is a risk that the correlation value of the synchronization TS signal compensated for the optical frequency offset by each of the candidates (A) to (C) may not be normally obtained. For this reason, the control unit 300 designates a bandwidth of −20 (GHz) to 20 (GHz) as the evaluation target bandwidth BWv.

Among the power distributions for the respective candidates (A) to (C), the power distribution for the candidate (C) has the greatest average value of the power in the evaluation target bandwidth BWv. Thus, the candidate selection unit 307 selects the candidate (C) as the initial value of the compensation value for the optical frequency offset.

Referring to FIG. 7 again, the candidate selection unit 307 notifies the initial compensation value setting unit 308 and the initial coefficient setting unit 310 of the selection result.

The candidates (A) to (C) are input from the candidate generation unit 302 to the initial compensation value setting unit 308. The initial compensation value setting unit 308 sets the candidate (C) according to the selection result by the candidate selection unit 307 in the offset estimation unit 210 as the initial value of the compensation value for the optical frequency offset. Thus, at start-up of the receiver 2, the offset compensation unit 203 is capable of compensating the electric field signals Xi, Xq, Yi, and Yq for the optical frequency offset based on the appropriate compensation value.

The transmission channel estimation result is input to the initial coefficient setting unit 310 from each of the transmission channel estimation units 305 via the IFFT unit 309. The IFFT unit 309 converts the tap coefficients of the transmission channel estimation result from the frequency domain values to the time domain values.

The initial coefficient setting unit 310 selects the tap coefficients according to the selection result by the candidate selection unit 307 from among the tap coefficients of the transmission channel estimation results, and sets the selected tap coefficients as the initial values in the adaptive equalization unit 202 and the coefficient update unit 209. As a result, at start-up of the receiver 2, the adaptive equalization unit 202 is capable of compensating the electric field signals Xi, Xq, Yi, and Yq based on the appropriate tap coefficients for waveform distortion caused in an optical signal due to polarization mode dispersion or polarization dependent loss in the transmission channel 90. Here, the initial coefficient setting unit 310 is an example of a coefficient setting unit that sets the initial values of the tap coefficients according to the initial value of the compensation value for the optical frequency offset.

The control unit 300 controls the above-described operation sequence.

Figure 12:
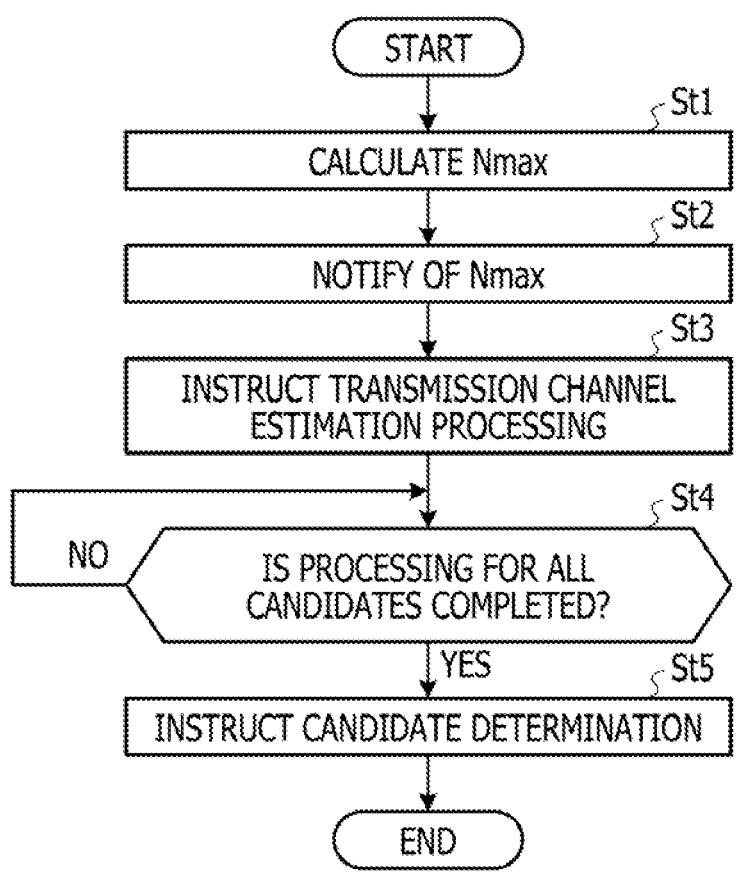
FIG. 12 is a flowchart illustrating an example of an operation of a control unit.

FIG. 12 is a flowchart illustrating an example of an operation of the control unit 300. As described above, the control unit 300 calculates the maximum value Nmax from the parameters in the parameter storage unit 311 (step St1), and notifies the candidate generation unit 302 of the maximum value Nmax (step St2).

Next, the control unit 300 instructs each of the transmission channel estimation units 305 to perform the transmission channel estimation processing (step St3). In response to this, each of the transmission channel estimation units 305 executes the transmission channel estimation processing.

Then, the control unit 300 determines whether or not the transmission channel estimation processing for all the candidates (A) to (C) is completed based on response signals from the transmission channel estimation units 305 (step St4). When the transmission channel estimation processing for any of the candidates (A) to (C) is not completed (No in step St4), the process in step St4 is executed again.

When the transmission channel estimation processing for all the candidates (A) to (C) is completed (Yes in step St4), the control unit 300 instructs the power calculation units 306 and the candidate selection unit 307 to make a candidate determination from among the candidates (A) to (C) (step St5). In response to this, each of the power calculation units 306 calculates the average value of power from the transmission channel estimation result, and the candidate selection unit 307 selects the initial value of the compensation value for the optical frequency offset from the candidates (A) to (C). The control unit 300 operates in the above-mentioned way.

Figure 13:
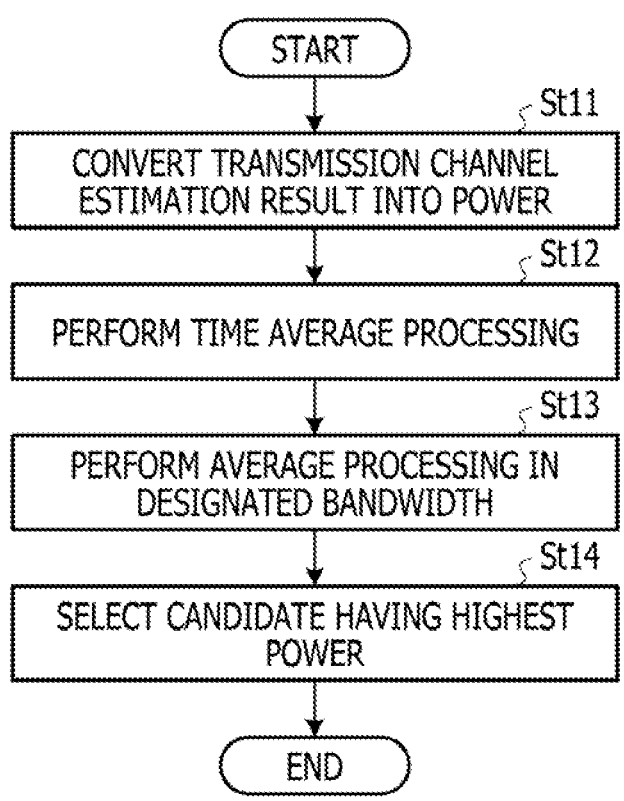
FIG. 13 is a flowchart illustrating an example of operations of a power calculation unit and a candidate selection unit.

FIG. 13 is a flowchart illustrating an example of operations of the power calculation units 306 and the candidate selection unit 307. Each of the power calculation units 306 converts the transmission channel estimation result into power on the frequency axis (step St11). After that, the power calculation unit 306 calculates a time average of the power (step St12).

Next, the power calculation unit 306 calculates an average value of the power within the bandwidth designated by the control unit 300 (step St13). Then, the candidate selection unit 307 selects the candidate having the greatest average value of the power among the candidates (A) to (C) (step St14). The power calculation units 306 and the candidate selection unit 307 operate in the above-mentioned way.

As described above, the reference estimated value calculation unit 301 calculates the reference estimated value θinit of the optical frequency offset from the synchronization TS signals in the electric field signals Xi, Xq, Yi, and Yq. The candidate generation unit 302 generates multiple candidates (A) to (C) for the compensation value from the reference estimated value θinit. Each of the power calculation units 306 calculates the power of the optical signal compensated for the optical frequency offset based on the corresponding one of the candidates (A) to (C). The candidate selection unit 307 selects the initial value of the compensation value from the multiple candidates (A) to (C) based on the power of the optical signals.

According to this configuration, the candidate generation unit 302 generates multiple candidates from the reference estimated value θinit. This makes it possible to expand the range of the compensation value for the optical frequency offset. Since the power calculation units 306 calculate the power of the optical signals compensated for the optical frequency offset based on the multiple candidates (A) to (C), it is possible to appropriately evaluate whether each of the candidates (A) to (C) is appropriate as the compensation value for the optical frequency offset. Since the candidate selection unit 307 selects the initial value of the compensation value from the multiple candidates (A) to (C) based on the power of the optical signals, it is possible to set an appropriate initial value for compensating for the optical frequency offset. Accordingly, the receiver 2 and the reception processing circuit 20 may compensate for a wide range of optical frequency offset.

The foregoing embodiment is an example of a preferred embodiment of the present disclosure. However, the disclosure is not limited to this embodiment, but may be modified in various ways without departing from the scope of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A signal processing device comprising:
a memory; and
a processor coupled to the memory and configured to:
compensate an electric field signal representing an electric field component in an optical signal input from a transmission channel for an optical frequency offset between light sources on a transmission side and a reception side of the optical signal based on a compensation value;
calculate an estimated value of the optical frequency offset from data having a fixed pattern in the electric field signal;
generate a plurality of candidates for the compensation value from the estimated value;
calculate power of the optical signal compensated for the optical frequency offset based on each of the plurality of candidates; and
select an initial value of the compensation value from the plurality of candidates based on the power of the optical signal.

2. The signal processing device according to claim 1, wherein the processor generates the plurality of candidates for the compensation value by shifting the estimated value within a range according to accuracy of a center frequency of each of the light sources on the transmission side and the reception side of the optical signal.

3. The signal processing device according to claim 1, wherein the processor selects the candidate having the highest power of the optical signal among the plurality of candidates.

4. The signal processing device according to claim 1, wherein the processor is configured to:
perform adaptive equalization on the electric field signal in accordance with filter coefficients to compensate for degradation caused in the optical signal in the transmission channel; and
set initial values of the filter coefficients according to the initial value of the compensation value.

5. A transmission device comprising:
a first light source configured to output local oscillation light; and
an optical transmitter coupled to the first light source and configured to:
convert an optical signal input from a transmission channel into an electric signal by detecting the optical signal with the local oscillation light and receive the electric signal;
convert the electric signal into an electric field signal representing an electric field component in the optical signal; and
compensate the electric field signal for an optical frequency offset between the first light source and a second light source on a transmission side of the optical signal based on a compensation value;
calculate an estimated value of the optical frequency offset from data having a fixed pattern in the electric field signal;
generate a plurality of candidates for the compensation value from the estimated value;
calculate power of the optical signal compensated for the optical frequency offset based on each of the plurality of candidates; and
select an initial value of the compensation value from the plurality of candidates based on the power of the optical signal.

6. The transmission device according to claim 5, wherein the optical transmitter generates the plurality of candidates for the compensation value by shifting the estimated value within a range according to accuracy of a center frequency of each of the light sources on the transmission side and the reception side of the optical signal.

7. The transmission device according to claim 5, wherein the optical transmitter selects the candidate having the highest power of the optical signal among the plurality of candidates.

8. The transmission device according to claim 5, wherein the optical transmitter is configured to:
perform adaptive equalization on the electric field signal in accordance with filter coefficients to compensate for degradation caused in the optical signal in the transmission channel; and
set initial values of the filter coefficients according to the initial value of the compensation value.

* * * * *